(12) United States Patent
Sharma et al.

(10) Patent No.: US 9,658,750 B2
(45) Date of Patent: May 23, 2017

(54) PRIVATE MESSAGING VIA CONTENT PROVIDER WEB SITES AND APPLICATIONS

(71) Applicant: Verizon Patent and Licensing Inc., Basking Ridge, NJ (US)

(72) Inventors: Manish Sharma, San Jose, CA (US); Kevin Flores, San Jose, CA (US); Devin Blong, Penngrove, CA (US); Tushar Chaudhary, Mountain View, CA (US); Annu Yadav, San Francisco, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 275 days.

(21) Appl. No.: 14/132,797

(22) Filed: Dec. 18, 2013

(65) Prior Publication Data

US 2015/0172250 A1 Jun. 18, 2015

(51) Int. Cl.
*G06F 3/0481* (2013.01)
*G06F 3/0484* (2013.01)
*H04L 12/18* (2006.01)
*H04L 12/58* (2006.01)

(52) U.S. Cl.
CPC .......... *G06F 3/0484* (2013.01); *G06F 3/0481* (2013.01); *H04L 12/1813* (2013.01); *H04L 51/08* (2013.01); *H04L 12/58* (2013.01)

(58) Field of Classification Search
CPC . G06F 3/0481; G06F 3/0484; H04L 12/1813; H04L 51/32
See application file for complete search history.

(56) References Cited

U.S. PATENT DOCUMENTS

| | | | |
|---|---|---|---|
| 8,359,310 B1* | 1/2013 | Frank | H04L 51/36 707/724 |
| 2007/0275740 A1* | 11/2007 | Deutsch | H04L 12/583 455/466 |
| 2007/0283278 A1* | 12/2007 | Hupfer | G06F 9/542 715/751 |
| 2008/0010344 A1* | 1/2008 | Wherry | G06F 17/30893 709/204 |
| 2008/0306959 A1* | 12/2008 | Spivack | G06F 17/3089 |
| 2009/0013265 A1* | 1/2009 | Cole | H04L 51/04 715/758 |
| 2009/0037414 A1* | 2/2009 | Olivier | G06Q 30/02 |
| 2009/0113315 A1* | 4/2009 | Fisher | H04L 12/1827 715/758 |

(Continued)

*Primary Examiner* — Eric J Bycer

(57) ABSTRACT

A device provides content for display to a first user device associated with a user, and provides for display, to the first user device, an option to share the content. The device receives a selection of the option from the first user device, and causes a list of contacts, associated with the user, to be presented for display, on the first user device, based on the selection of the option. The device receives, from the first user device, a selection of a contact from the list of contacts, and receives, from the first user device, a message from the user for the selected contact. The device provides for display the message with the content, to the first user device and to a second user device, associated with the selected contact. The message is privately provided to only the first user device and the second user device.

20 Claims, 13 Drawing Sheets

(56) References Cited

U.S. PATENT DOCUMENTS

| | | | | |
|---|---|---|---|---|
| 2009/0124270 A1* | 5/2009 | Kelley | ............... | H04L 63/0407 455/466 |
| 2009/0147958 A1* | 6/2009 | Calcaterra | ............. | H04L 9/0822 380/260 |
| 2009/0172565 A1* | 7/2009 | Jackson | ............. | H04L 67/1095 715/753 |
| 2010/0037153 A1* | 2/2010 | Rogers | ................ | G06F 3/0481 715/758 |
| 2010/0075641 A1* | 3/2010 | Schwartz | ............ | H04L 12/5895 455/414.1 |
| 2010/0318611 A1* | 12/2010 | Curtin | .................... | G06F 17/30 709/206 |
| 2010/0325560 A1* | 12/2010 | Bryan | ................... | G06Q 10/00 715/753 |
| 2012/0151383 A1* | 6/2012 | Kazan | ................ | G06Q 10/101 715/753 |
| 2012/0302222 A1* | 11/2012 | Williamson | .......... | H04W 4/001 455/418 |
| 2012/0311029 A1* | 12/2012 | Schuster | ............... | G06Q 10/10 709/204 |
| 2013/0191762 A1* | 7/2013 | Rajagopalan | ....... | H04L 12/1818 715/753 |
| 2013/0246525 A1* | 9/2013 | Patil | .................... | G06Q 10/107 709/204 |

\* cited by examiner

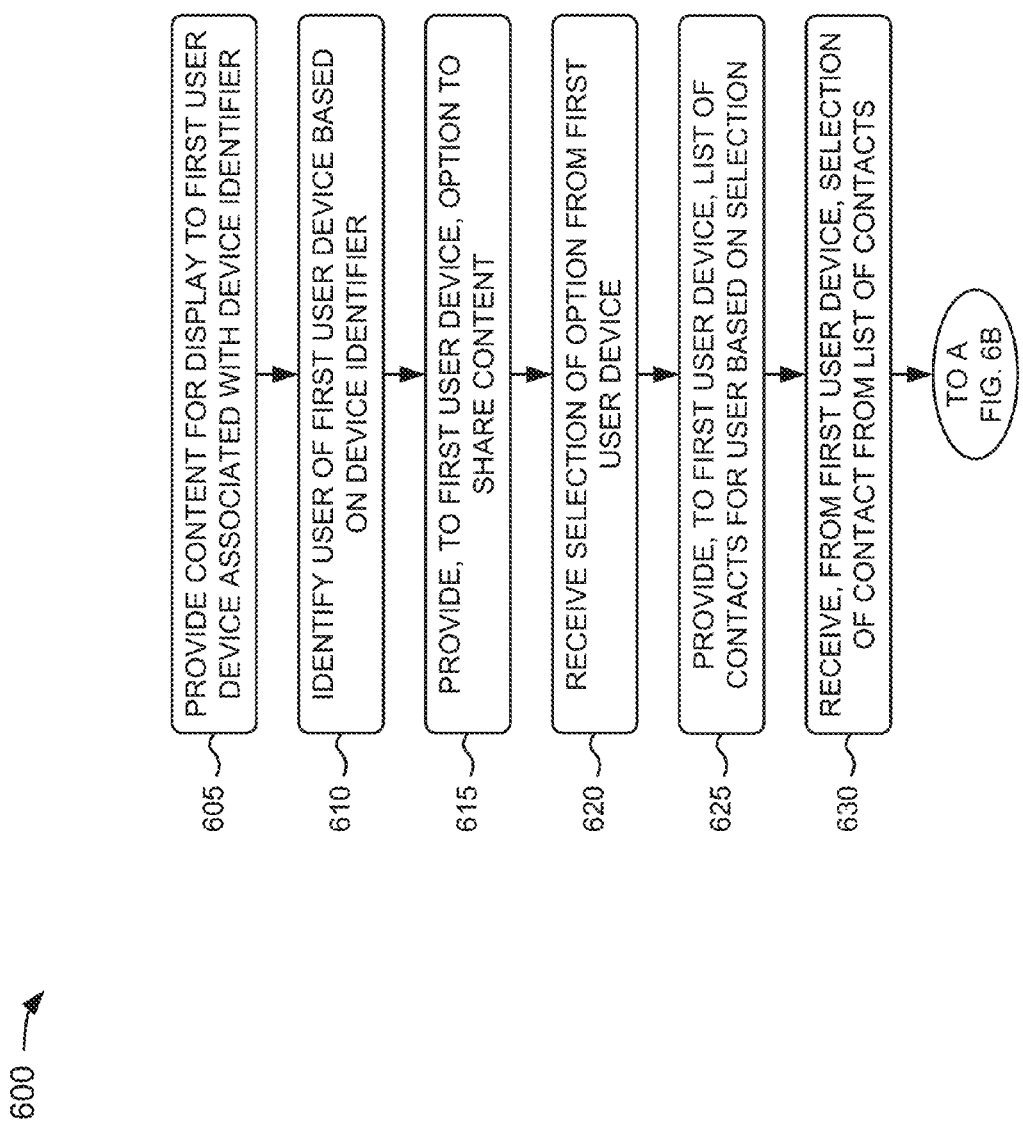

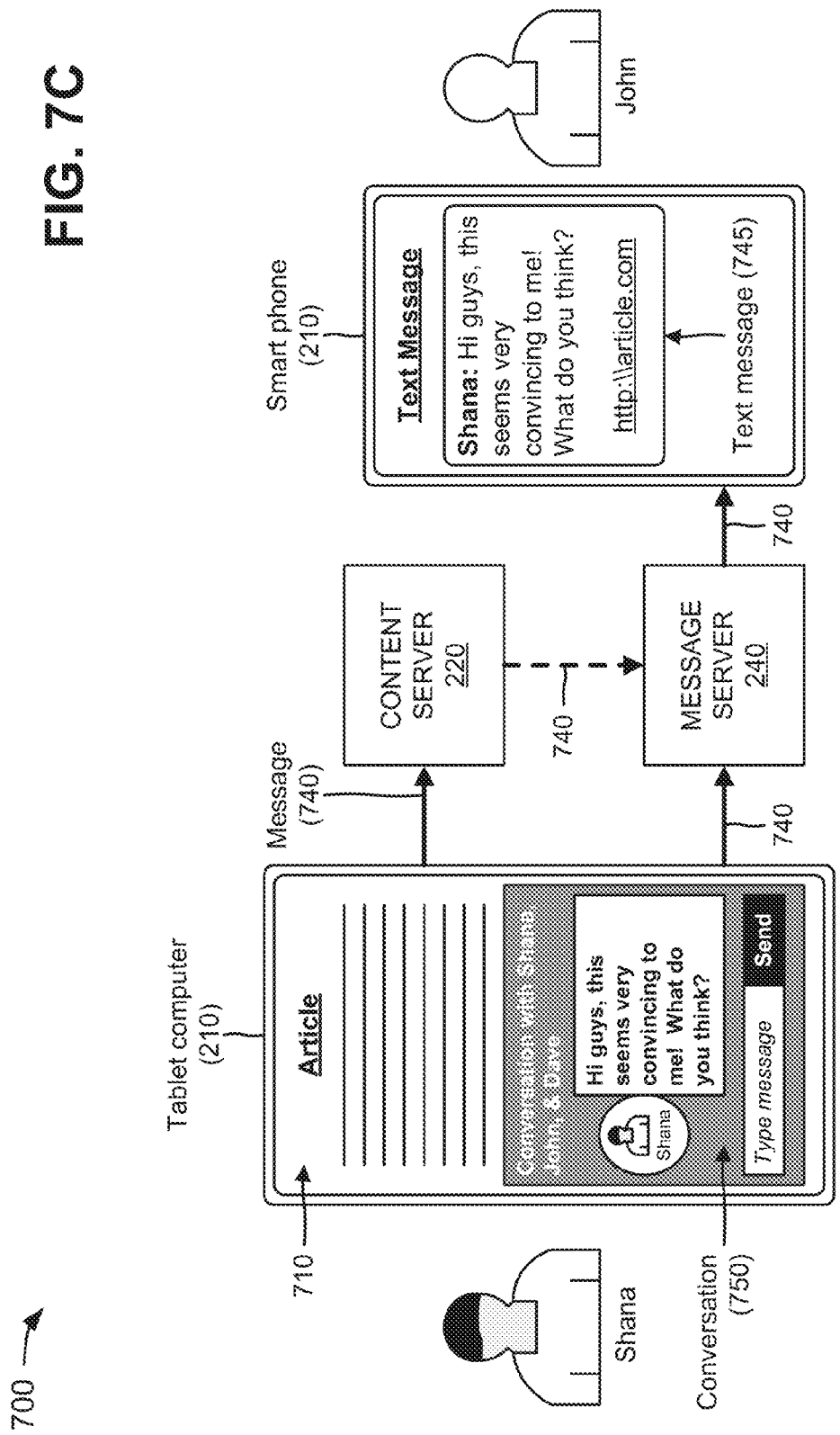

PRIVATE MESSAGING VIA CONTENT PROVIDER WEB SITES AND APPLICATIONS

BACKGROUND

A user may utilize a device (e.g., a smart phone, a laptop computer, etc.) to access and view content, such as, for example, a web site, a video, etc., provided by a content provider. The user may share the content with other users via messaging applications, such as an email application, a text messaging application, an instant messaging application, etc. For example, the user may generate an email message addressed to another user, and may provide a link to the content in the email message. The user may send the email message to a device associated with the other user, and the other user may utilize the device to select the link and view the content.

BRIEF DESCRIPTION OF THE DRAWINGS

FIGS. 6A and 6B provide a flow chart of an example process for providing private messages via content provider web sites and/or applications; and FIGS. 7A-7F are diagrams of an example relating to the example process shown in FIGS. 6A and 6B.

DETAILED DESCRIPTION OF PREFERRED EMBODIMENTS

The following detailed description refers to the accompanying drawings. The same reference numbers in different drawings may identify the same or similar elements.

Figure 1:
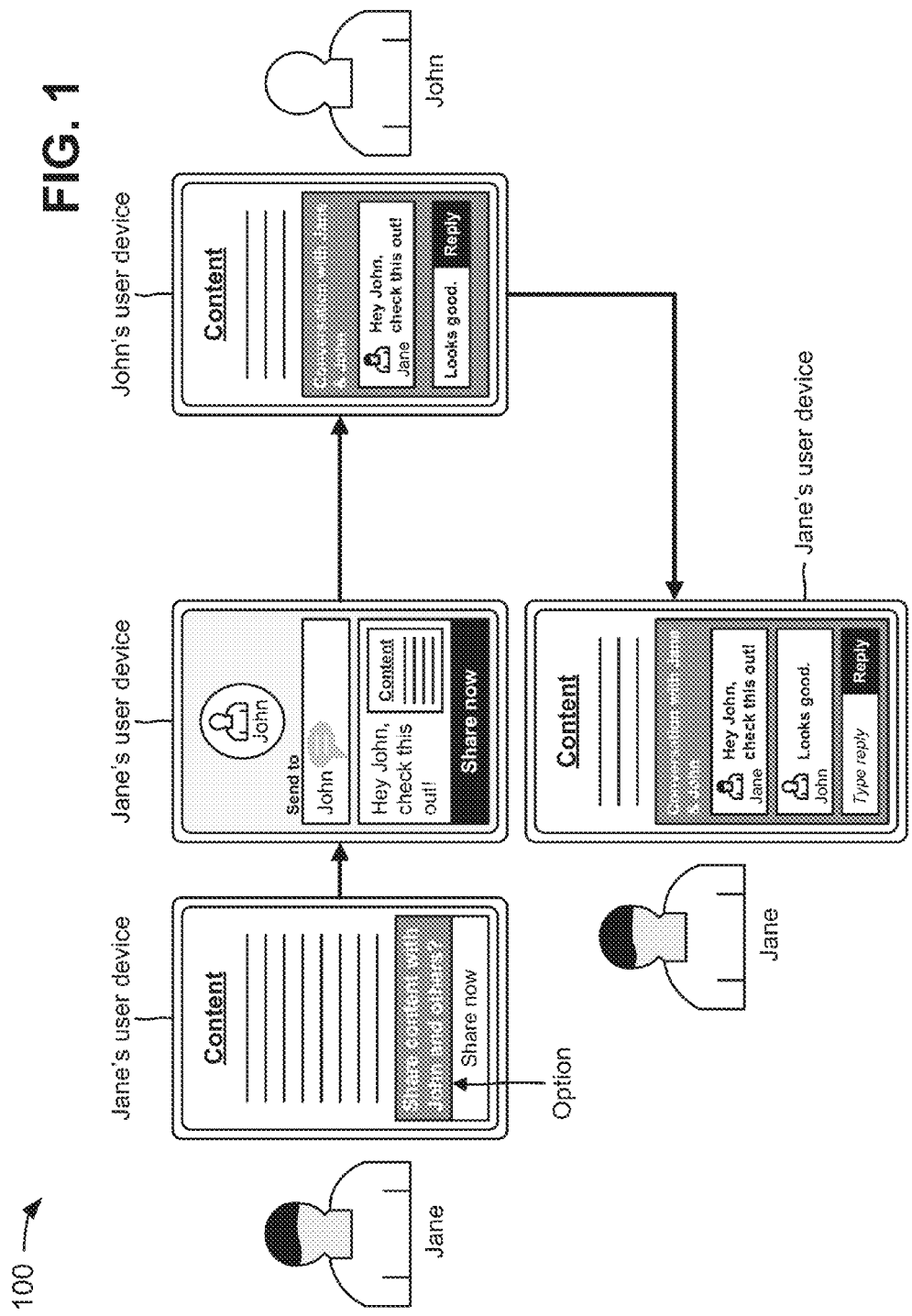
FIG. 1 is a diagram of an overview of an example implementation described herein.

FIG. 1 is a diagram of an overview of an example implementation 100 described herein. As shown in FIG. 1, assume that Jane is associated with a user device that receives content (e.g., provided by a web site) from a content provider. Further, assume that Jane wants to share the content with her friend John, and that the web site includes an option to share the content with John and other friends of Jane. Jane may select the option, and the web site may display information associated with John and other friends of Jane.

Jane may select one or more of her friends, and may indicate how to share the content with each of her selected friends. For example, as shown in FIG. 1, Jane may select John, and may indicate that she wants to share the content with John via a text messaging application provided on Jane's user device. As further shown, the web site may enable Jane to create a private message (e.g., "Hey John, check this out") for John (e.g., that may only be seen by Jane and John), and to include information associated with the content (e.g., a link) in the private message. Jane may instruct her user device to share the private message with John via the web site, and Jane's user device may provide the private message to John via the text messaging application.

John's user device may receive the private message via a text messaging application provided on John's user device, and may select the link for the content. When John selects the link, John's user device may receive the content from the content provider, and may display the content and Jane's private message. The web site may enable John to create a private reply message to Jane directly via the web site, rather than via the text messaging application. John may create the private reply message (e.g., "Looks good"), and may select a Reply or a Send mechanism (e.g., a button, an icon, a menu, etc.). The web site may add the private reply message to the private message to create a private conversation between Jane and John. The private conversation may only be viewed on user devices, used by Jane and John, directly via the web site. As further shown in FIG. 1, Jane may view John's private reply message directly via the web site, rather than via the text messaging application. Jane and John may continue the private conversation about the content, directly via the web site.

The systems and/or methods described herein may enable users to conduct a private conversation about content directly via a content provider's web page, web site, application, etc., without utilizing a messaging application. The systems and/or methods may also enable the content provider to analyze the private conversation so that the content provider may determine whether the content is liked, disliked, preferred, not preferred, etc.

Content, as used herein, is to be broadly interpreted to include a web site, a web page, an application, a video, audio, an image, text, a software download, and/or a combination of a web site, a web page, an application, a video, audio, an image, text, and/or a software download.

Figure 2:
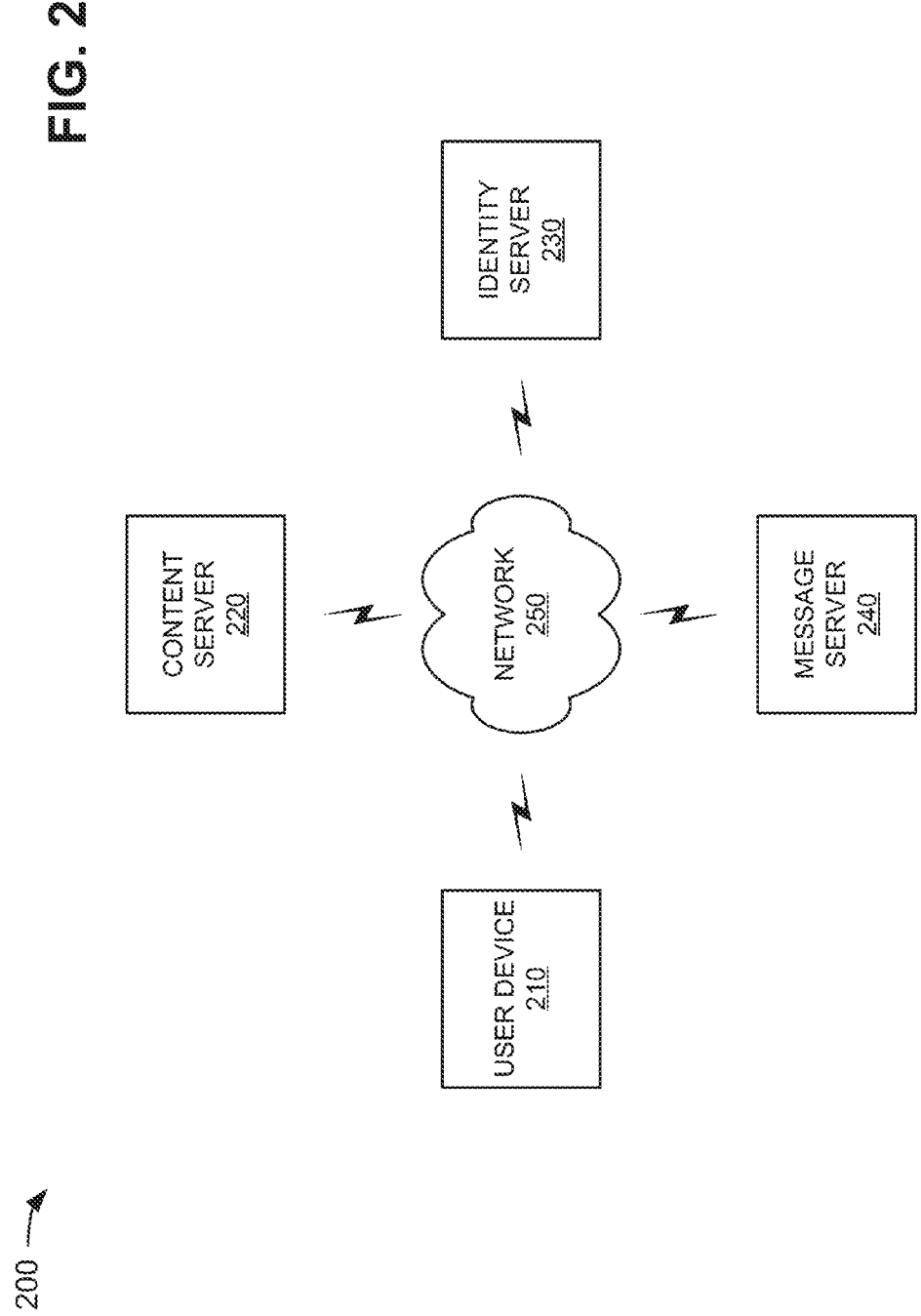
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, a content server 220, an identity server 230, a message server 240, and a network 250. Devices/networks of environment 200 may interconnect via wired connections, wireless connections, or a combination of wired and wireless connections.

User device 210 may include a device that is capable of communicating over network 250 with content server 220, identity server 230, and/or message server 240. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a personal computer; a landline telephone; a gaming device; or another type of computation and communication device.

Content server 220 may include one or more personal computers, workstation computers, server devices, or other types of computation and communication devices. In some implementations, content server 220 may provide content to user device 210 (e.g., via a web site and/or an application), and may enable a user of user device 210 to share the content with other users directly via the web site and/or the application. In some implementations, content server 220 may enable the user of user device 210 to conduct a private conversation with one or more other users directly via the web site and/or the application. The private conversation may only be viewed on user devices 210 used by the user and the one or more other users.

Identity server 230 may include one or more personal computers, workstation computers, server devices, or other types of computation and communication devices. In some implementations, identity server 230 may be associated with a communication provider (e.g., an Internet service provider, a telecommunications service provider, etc.) of the user of user device 210. In some implementations, identity server 230 may identify the user of user device 210 based on an identifier (e.g., a mobile directory number (MDN), a mobile equipment identifier (MEID), an Internet protocol (IP) address, etc.) associated with user device 210. In some implementations, identity server 230 may provide software code (e.g., messaging code) to content server 220. The software code may enable the user of user device 210 to conduct a private conversation with one or more other users directly via the web site and/or the application provided by content server 220.

Message server 240 may include one or more personal computers, workstation computers, server devices, or other types of computation and communication devices. In some implementations, message server 240 may provide a messaging service for user device 210. For example, message server 240 may provide an email messaging service for user device 210, a short message service (SMS) or text messaging service for user device 210, an instant messaging service for user device 210, etc.

Network 250 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
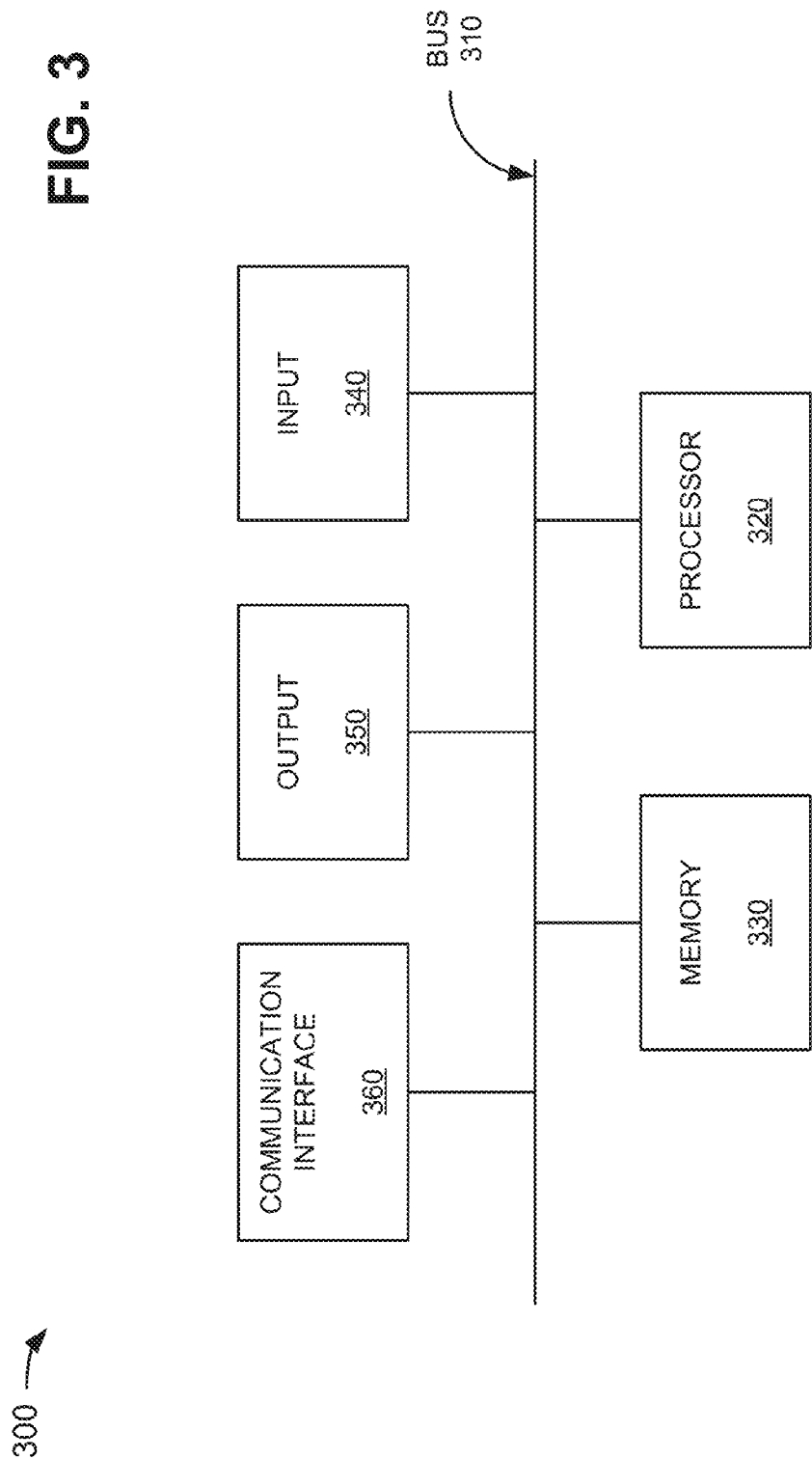
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, mouse, a button, a switch, etc.). Output component 350 may include a component that outputs information from device 300 (e.g., a display, a speaker, one or more light-emitting diodes (LED's), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
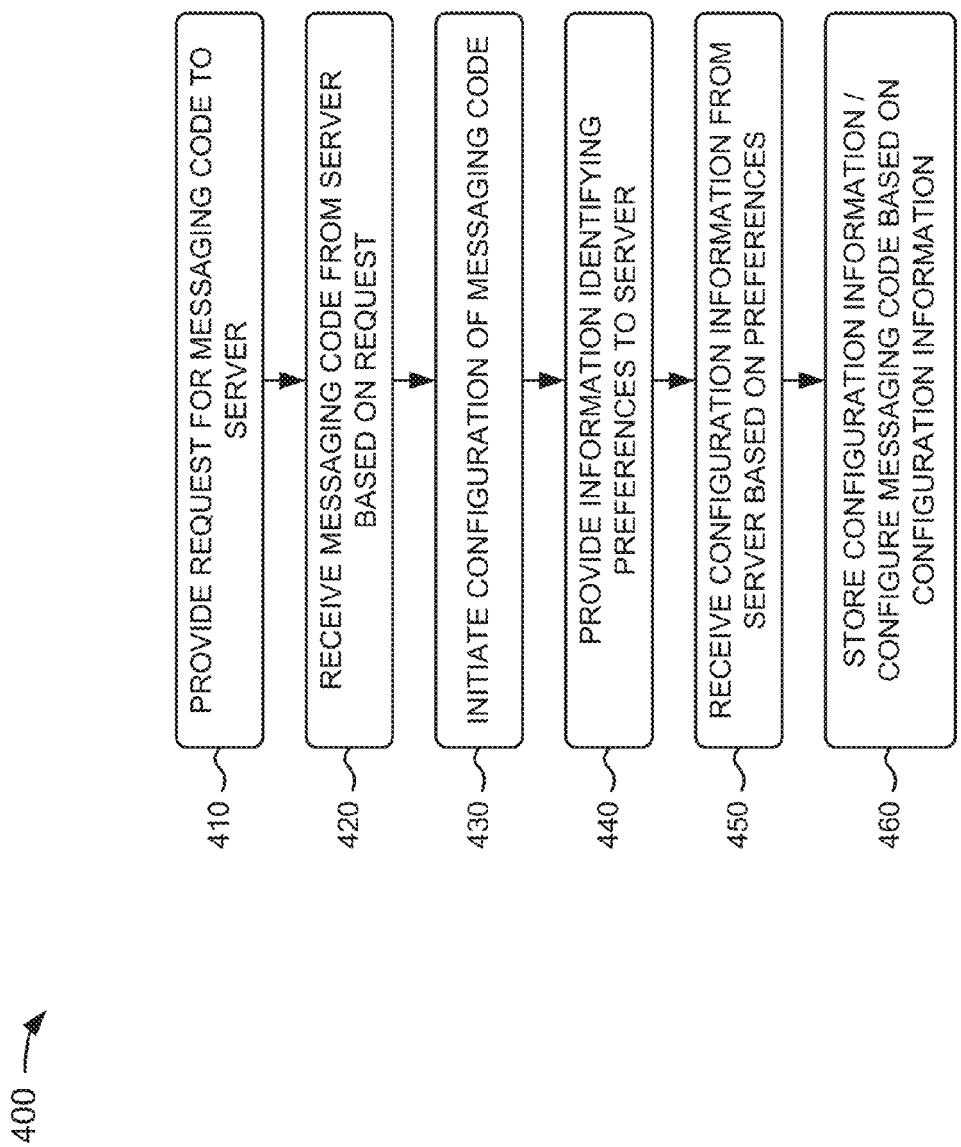
FIG. 4 is a flow chart of an example process for receiving and configuring code that enables content provider web sites and/or applications to provide private messaging.

FIG. 4 is a flow chart of an example process 400 for receiving and configuring code that enables content provider web sites and/or applications to provide private messaging. In some implementations, one or more process blocks of FIG. 4 may be performed by content server 220. In some implementations, one or more process blocks of FIG. 4 may be performed by another device or a group of devices separate from or including content server 220.

As shown in FIG. 4, process 400 may include providing a request for messaging code to a server (block 410). For example, a content provider may cause content server 220 to provide a request for messaging code to identity server 230. In some implementations, the messaging code may include an application, a code snippet, a script, a widget, etc. that may enable a user of user device 210 to conduct a private conversation with one or more other users directly via a web site and/or an application provided by content server 220. In some implementations, the content provider may cause content server 220 to access the messaging code via, for example, a user interface (such as a browser) or in another manner. The content provider may then select, using content server 220, information regarding the messaging code from the user interface to cause content server 220 to provide a request for the messaging code to identity server 230. In some implementations, identity server 230 may offer the messaging code to content server 220 without content server 220 providing the request for the messaging code.

As further shown in FIG. 4, process 400 may include receiving the messaging code from the server based on the request (block 420). For example, content server 220 may receive the messaging code from identity server 230, and may store the messaging code in a memory associated with content server 220 (e.g., memory 330, FIG. 3). In some implementations, the content provider, of content server 220, may establish an account associated with the messaging code prior to or after receiving the messaging code.

As further shown in FIG. 4, process 400 may include initiating a configuration of the messaging code (block 430). For example, the content provider may initiate the messaging code and identify, using content server 220, one or more preferences relating to enabling a user of user device 210 to conduct a private conversation with one or more other users directly via content provided by content server 220. In some implementations, the content provider may identify the one or more preferences using one or more elements of a user interface provided by content server 220. The one or more elements may include, for example, one or more text input elements, one or more drop down menu elements, one or more checkbox elements, one or more radio button elements, and/or any other types of elements that may be used to receive information from the content provider.

In some implementations, the one or more preferences may include a preference of the content provider with respect to when to initiate the messaging code for the user of user device 210, such as, for example, when content is accessed by user device 210, when content is scrolled by the user via user device 210, at the end of content, etc.

In some implementations, the one or more preferences may include a preference of the content provider with respect to the user's list of contacts. For example, the content provider may elect to utilize or not utilize the user's list of contacts in order to establish a private conversation between the user and one or more of the contacts, in the user's list of contacts, directly via content provided by content server 220.

In some implementations, the one or more preferences may include a preference of the content provider with respect to the user's methods of sharing information with the list of contacts. For example, the content provider may elect to automatically utilize or not utilize the user's methods of sharing information (e.g., via email, text messaging, etc.) with contacts when sharing content with the contacts.

In some implementations, a type of the account, of the content provider, associated with the messaging code may determine the quantity of preferences that the content provider is able to identify. For example, the messaging code may enable the content provider to identify only a portion of the above preferences or identify additional preferences based on the type of the account with which the content provider is associated.

As further shown in FIG. 4, process 400 may include providing information identifying one or more preferences to the server (block 440). For example, the content provider may cause content server 220 to provide, to identity server 230, information identifying the one or more preferences relating to the content provider and provided during the configuration of the messaging code.

As further shown in FIG. 4, process 400 may include receiving configuration information from the server based on the preferences (block 450). For example, content server 220 may receive, from identity server 230, configuration information that may be used to configure the messaging code to enable a user of user device 210 to conduct a private conversation with one or more other users directly via a web site and/or an application provided by content server 220.

In some implementations, identity server 230 may generate the configuration information, which may be used to configure the messaging code, based on the information identifying the one or more preferences of the content provider. For example, the configuration information may include information that indicates that the messaging code is to be initiated when content is accessed from content server 220, information that indicates that the messaging code is to be initiated when the content is scrolled by a user of user device 210, and/or information that indicates that messaging code is to be initiated at the end of the content.

In some implementations, the configuration information may include information that enables a user of user device 210 to conduct a private conversation with one or more other users directly via a web site and/or an application provided by content server 220. In some implementations, the configuration information may include information that indicates whether content server 220 may obtain a user's list of contacts, for sharing content, from identity server 230. In some implementations, the configuration information may include information that indicates whether the content server 220 may obtain, from identity server 230, the user's methods of sharing information with the contacts when sharing content.

In some implementations, the configuration information may be obtained from a data structure. In some implementations, identity server 230 may provide, to content server 220, the configuration information independent of receiving the information identifying the one or more preferences of the content provider.

As further shown in FIG. 4, process 400 may include storing the configuration information and configuring the messaging code based on the configuration information (block 460). For example, the content provider may cause content server 220 to store all or a portion of the configuration information received from identity server 230. The messaging code may be configured based on storing all or a portion of the configuration information.

In some implementations, identity server 230 may provide updates, to the configuration information, to content server 220 based on use of the messaging code by the content provider and/or by users of user devices 210. For example, identity server 230 may provide updates to the configuration information when the content provider utilizes the messaging code to enable a user of user device 210 to conduct a private conversation with one or more other users directly via a web site and/or an application provided by content server 220. In another example, identity server 230 may receive updates, to the configuration information, from one or more other content providers and may provide the received updates to content server 220. Content server 220 may store the updates to the configuration information. In some implementations, identity server 230 may provide the updates periodically based on a preference of the content provider and/or based on a time frequency determined by identity server 230. In some implementations, identity server 230 may determine whether to provide the updates based on the type of the account associated with the content provider.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
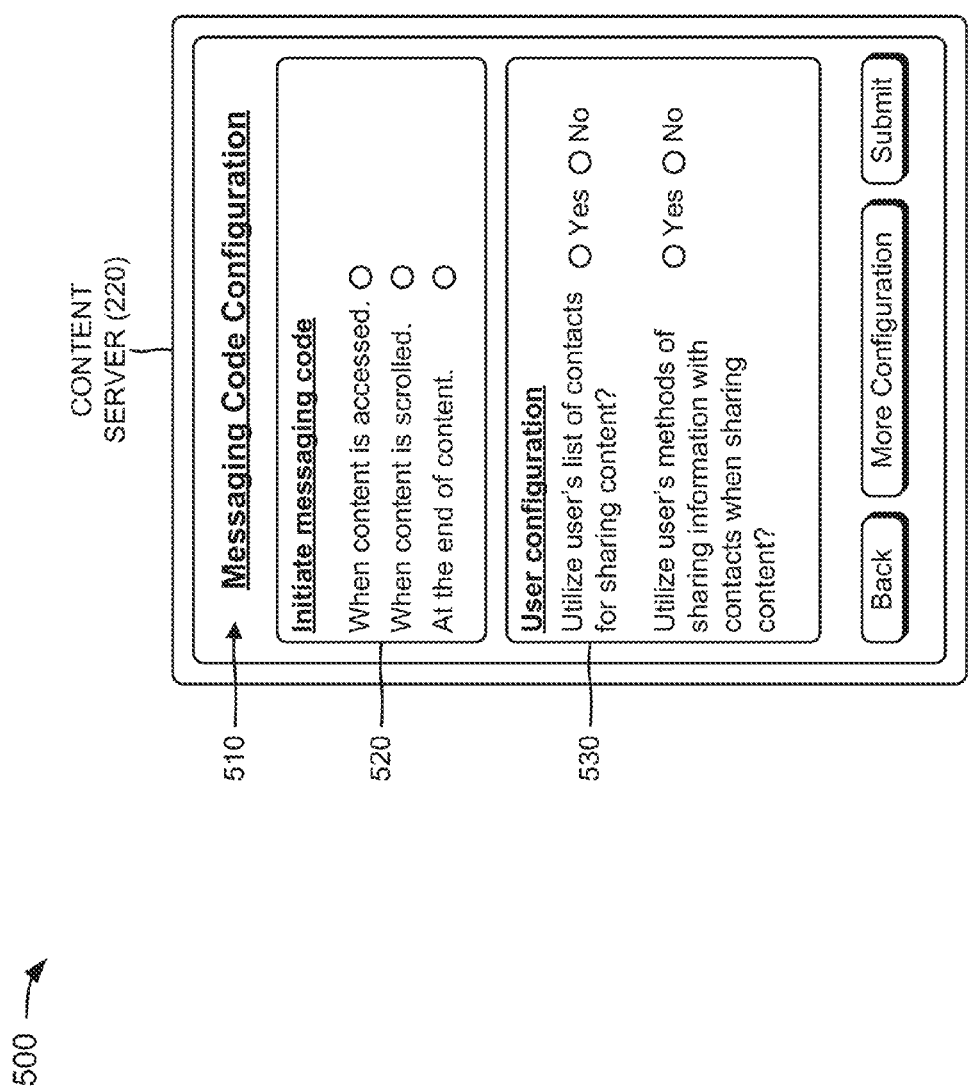
FIG. 5 is a diagram of an example user interface that may be used in connection with the example process shown in FIG. 4.

FIG. 5 is diagram of an example user interface 500 that may be used in connection with example process 400 shown in FIG. 4. In some implementations, user interface 500 may be provided by content server 220 to a content provider to enable the content provider to identify information (e.g., preferences) that may be used to configure messaging code 510 to enable a user of user device 210 to conduct a private conversation with one or more other users directly via a web site and/or an application provided by content server 220.

As shown in FIG. 5, user interface 500 may allow the content provider to configure different features of messaging code 510. For example, the content provider may identify preferences for initiation of messaging code 510 in a configuration section 520. In some implementations, the content provider may indicate that the content provider wants to initiate messaging code 510 when content is accessed from content server 220 by user device 210. In some implementations, the content provider may indicate that the content provider wants to initiate messaging code 510 when content, provided by content server 220, is scrolled by the user of user device 210. In some implementations, the content provider may indicate that the content provider wants to initiate messaging code 510 at the end of content provided by content server 220 to user device 210. In some implementations, the content provider may indicate whether the content provider wants to initiate messaging code 510 a particular amount of time after user device 210 accesses the content. For example, if the user does not move away from the content within a particular amount of time (e.g., in seconds, minutes, etc.), then content server 220 may initiate messaging code 510.

As further shown in FIG. 5, the content provider may identify preferences for utilizing information associated with users of user devices 210 in another configuration section 530. In some implementations, the content provider may indicate whether the content provider wants to utilize a user's list of contacts for sharing content provided by content server 220 to user device 210. In some implementations, the content provider may indicate whether the content provider wants to utilize the user's methods of sharing information with the contacts when sharing content provided by content server 220.

Once the content provider has identified the preferences, user interface 500 may allow the content provider to select a "Submit" option to store the preferences and/or submit the preferences to identity server 230. Identity server 230 may then provide, to content server 220, configuration information based on the preferences.

As further shown in FIG. 5, user interface 500 may also allow the content provider to select a "Back" option to cause content server 220 to provide information regarding messaging code 510. As also shown in FIG. 5, user interface 500 may also allow the content provider to select a "More Configuration" option to enable the content provider to identify additional information that may be used to configure messaging code 510.

The number of elements of user interface 500 shown in FIG. 5 is provided for explanatory purposes. In practice, user interface 500 may include additional elements, fewer elements, different elements, or differently arranged elements than those shown in FIG. 5.

Figure 6B:
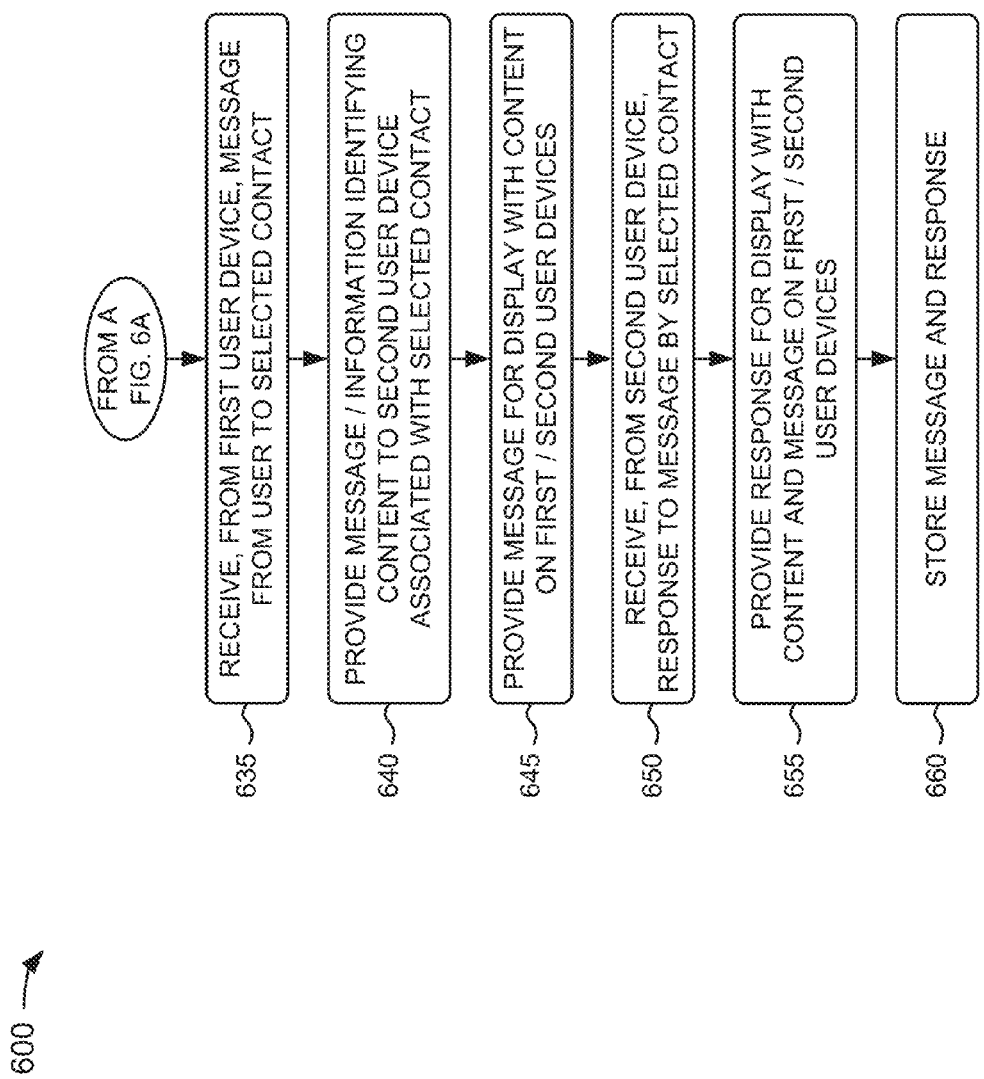

FIGS. 6A and 6B provide a flow chart of an example process 600 for providing private messages via content provider web sites and/or applications. In some implementations, one or more process blocks of FIGS. 6A and 6B may be performed by content server 220. In some implementations, one or more process blocks of FIGS. 6A and 6B may be performed by another device or a group of devices separate from or including content server 220.

As shown in FIG. 6A, process 600 may include providing content for display to a first user device associated with a device identifier (block 605). For example, a user may utilize a first user device 210 to access content provided by content server 220. In some implementations, first user device 210 may access a web site, a web page, an application, etc. that includes content provided by content server 220, and may display the content to the user. For example, the user may provide, to first user device 210, an address (e.g., a uniform resource locator (URL)) associated with a web page provided by content server 220, and the first user device 210 may access the content via the web page and based on the address. In some implementations, the first user device 210 may include a device identifier, such as a MDN, a MEID, an IP address, etc. In some implementations, the first user device 210 may provide the device identifier to content server 220.

In some implementations, content server 220 may provide messaging code 510, with the content, to the first user device 210. In some implementations, content server 220 may not provide messaging code 510 to the first user device 210, and may execute messaging code 510 at content server 220.

As further shown in FIG. 6A, process 600 may include identifying a user of the first user device based on the device identifier (block 610). For example, content server 220 may identify the user of the first user device 210 based on the device identifier received from the first user device 210. In some implementations, content server 220 may provide the device identifier to identity server 230, and identity server 230 may identify the user of the first user device 210 based on the device identifier. In such implementations, identity server 230 may provide, to content server 220, information associated with the identified user of the first user device 210, such as, for example, a name of the user, a profile of the user, a list of contacts of the user, the user's methods of sharing information with the contacts, etc. In some implementations, content server 220 may store the information associated with the identified user of the first user device 210.

In some implementations, identity server 230 may include or be associated with a data structure (e.g., a database, a table, a list, etc.) that includes device identifiers (e.g., MDNs, MEIDs, etc.); information associated with users that correspond to the device identifiers (e.g., user names, user profiles, lists or address books of contacts associated with the users, methods of sharing information with the contacts, etc.); and other information (e.g., information associated with user devices 210 or components of user devices 210). Identity server 230 may compare the device identifier of the first user device 210 with the device identifiers provided in the data structure in order to identify a user associated with the device identifier of the first user device 210. In some implementations, if the device identifier of the first user device 210 matches a particular device identifier in the data structure, identity server 230 may determine that the user associated with the particular device identifier is the user of the first user device 210.

As further shown in FIG. 6A, process 600 may include providing, to the first user device, an option to share the content (block 615). For example, messaging code 510 may cause content server 220 to provide, to the first user device 210, an option to share the content provided by content server 220. In some implementations, the first user device 210 may display the option as a window, a banner, a menu, an icon, a widget, etc. with the content displayed by the first user device 210. In some implementations, the option may include information asking whether the user wants to share the content with one or more other users. In some implementations, content server 220 may personalize the option to include information asking whether the user wants to share the content with one or more contacts provided in the user's list of contacts and/or via the user's methods of sharing information with the one or more contacts. For example, assume that the user accesses a web page with a video, and that Fred and Martha are included in the user's list of contacts. Further, assume that the user communicates with Fred via email and with Martha via text messaging, as indicated in the user's list of contacts. In such an example, content server 220 may personalize the option to include information asking whether the user wants to share the video with Fred via email or with Martha via a text message.

As further shown in FIG. 6A, process 600 may include receiving selection of the option from the first user device (block 620). For example, the user may utilize the first user device 210 to select the option to share the content, and content server 220 may receive the user's selection of the option. In some implementations, when the user selects the option, the first user device 210 may provide, to content server 220, information (e.g., a message) indicating that the option is selected, and content server 220 may receive the information.

As further shown in FIG. 6A, process 600 may include providing, to the first user device, a list of contacts for the user based on the selection of the option (block 625). For example, based on the selection of the option to share the content, messaging code 510 may cause content server 220 to provide a list of contacts associated with the user to the first user device 210. In some implementations, content server 220 may obtain, from identity server 230, the list of contacts associated with the user. In some implementations, the list of contacts may include names of the contacts, contact information for the contacts, pictures of the contacts, and other information associated with the contacts. In some implementations, the first user device 210 may display the list of contacts to the user, and information instructing the user to select one or more contacts from the list of contacts.

In some implementations, content server 220 may request the list of contacts from identity server 230 (e.g., based on the device identifier associated with the first user device 210), and identity server 230 may provide the list of contacts to content server 220. In such implementations, the list of contacts of may be encrypted or unreadable by content server 220, but may be viewed at the first user device 210. In some implementations, content server 220 may provide code to the first user device 210, and the code may cause the first user device 210 to obtain the list of contacts from memory (e.g., of the first user device 210), from the cloud, from identity server 230, etc.

In some implementations, messaging code 510 may cause content server 220 to provide, to the first user device 210, a user interface that enables the user to create a message to send with the shared content. In some implementations, the message may include a textual message to one or more contacts and the content or information identifying the content (e.g., an address, such as a URL, for the content). In some implementations, the first user device 210 may display the list of contacts and the user interface to the user at the same time or separately.

As further shown in FIG. 6A, process 600 may include receiving, from the first user device, a selection of a contact from the list of contacts (block 630). For example, the user may utilize the first user device 210 to select one or more contacts from the list of contacts displayed by the first user device 210. In some implementations, the user may select a contact from the displayed list of contacts, and the first user device 210 may provide information associated with the selected contact to content server 220. In some implementations, the information associated with the selected contact may include information associated with the user's method of sharing information with the selected contact. For example, if Fred is the selected contact and the user shares information with Fred via email (e.g., as indicated by the list of contacts), the information associated with the selected contact may identify Fred and an email address associated with Fred. In some implementations, the user may specify another method to share information with the selected contact other than a typical method utilized to share information with the selected contact. In some implementations, the user may specify a new contact not provided in the list of contacts (e.g., rather than selecting a contact), and may specify a method of sharing information with the new contact.

As shown in FIG. 6B, process 600 may include receiving, from the first user device, a message from the user to the selected contact (block 635). For example, the user may utilize the user interface, displayed by the first user device 210, to create a message to send with the selected content. In some implementations, the message may include a textual message to the selected contact, a method via which to send the textual message, and information identifying the content (e.g., an address, such as a URL, for the content). For example, if Fred is the selected contact and the user elects to share the content with Fred via email, the first user device 210 may generate a message that includes Fred's email address. After the user creates the message, the user may instruct the first user device 210 to send the message to the selected contact via the method for sharing the content. In some implementations, the first user device 210 may provide the message to message server 240, and message server 240 may provide (e.g., via the method for sharing content) the message to a second user device 210 associated with the selected contact. In some implementations, the first user device 210 or message server 240 may provide the message to content server 220, and content server 220 may receive the message.

As further shown in FIG. 6B, process 600 may include providing the message and information identifying the content to a second user device associated with the selected contact (block 640). For example, content server 220 may forward the message and the information identifying the content, received from the first user device 210, to message server 240. In some implementations, message server 240 may forward (e.g., via the method for sharing content) the message and the information identifying the content to the second user device 210 associated with the selected contact. For example, if the message is to be provided to Martha via a text message, content server 220 or the first user device 210 may provide the message to message server 240, and message server 240 may provide the message, and the information identifying the content, to the second user device 210 via a text message.

In some implementations, message server 240 may convert the message into a format specified by the user for sharing the content with the selected contact. For example, if the user wishes to share the content via an instant message with the selected contact, message server 240 may convert the message into an instant message and may provide the instant message to the second user device 210 associated with the selected contact. In another example, if the user wishes to share the content via an email message with the selected contact, message server 240 may convert the message into an email message and may provide the email message to the second user device 210 associated with the selected contact.

As further shown in FIG. 6B, process 600 may include providing the message for display with the content on the first user device and the second user device (block 645). For example, after the message is provided to the second user device 210, messaging code 510 may cause content server 220 to provide the message for display, with the content, on the first user device 210 associated with the user and the second user device 210 associated with the selected contact. In some implementations, the message may be displayed in a portion of the content, such as at the beginning of the content, at the end of the content, within a scrolled portion of the content (e.g., as the user scrolls the content, the message may be continuously be displayed), etc. In some implementations, the message may be privately displayed, in the content, to only user devices 210 used by the user and the selected contact based on the device identifier associated with first user device 210 and/or based on a device identifier associated with the second user device 210. In some implementations, if the message is shared with multiple contacts, the message may be privately displayed, in the content, to only user devices 210 used by the user and the multiple contacts to which the content is shared. In some implementations, the content and the message may be provided to the second user device 210 based on the second user device 210 requesting the content (e.g., based on the selected contact selecting the content, the link for the content, or otherwise authorizing the content).

As further shown in FIG. 6B, process 600 may include receiving, from the second user device, a response to the message by the selected contact (block 650). For example, when the second user device 210 displays the message and the content to the selected contact, the second user device 210 may also display a section that enables the selected contact to provide a response to the message. In some implementations, the selected contact may provide a response (e.g., a textual message) to the message in the section, and may instruct the second user device 210 to send the response to the user. In some implementations, the second user device 210 may provide the response to content server 220, and content server 220 may receive the response.

As further shown in FIG. 6B, process 600 may include providing the response for display with the content and the message on the first user device and the second user device (block 655). For example, after the response is provided to content server 220, messaging code 510 may cause content server 220 to provide the response for display, with the content and the message, on the first user device 210 associated with the user and the second user device 210 associated with the selected contact. In some implementations, the response and the message may be displayed in a portion of the content, such as at the beginning of the content, at the end of the content, within a scrolled portion of the content, etc. In some implementations, the response and the message may be privately displayed, in the content, to only user devices 210 used by the user and the selected contact based on the device identifier associated with first user device 210 and/or based on the device identifier associated with the second user device 210. In some implementations, an entire conversation between the user and the selected contact may be privately displayed, in the content, to only user devices 210 used by the user and the selected contact.

In some implementations, if the message is shared with multiple contacts, the response and the message may be privately displayed, in the content, to only user devices 210 used by the user and the multiple contacts to which the content is shared. In some implementations, if the message is shared with multiple contacts, the response may be privately displayed, in the content, to only user devices 210 used by the user and the contact that provided the response, and may not be displayed to user devices 210 used by the other multiple contacts.

In some implementations, content server 220 may create a private version of the content for the first user device 210 and the second user device 210, and may provide the private version of the content to the first user device 210 and the second user device 210. The private version of the content may enable the user and the selected contact to privately comment on the content so if a third user device 210 accesses the content, the third user device 210 may not be able to display the private comments. For example, if the content is provided at a first page (e.g., www.webpage.com/123) and the private version of the content is provided at a second page (e.g., www.webpage.com/123/ABC), content server 220 may push the second page to the first user device 210 and the second user device 210, and may push the first page to the third user device 210. In some implementations, the private version of the content may expire after a particular amount of time (e.g., in seconds, minutes, etc.).

In some implementations, content server 220 may enable a conversation to be dynamically displayed via a standard web page. For example, assume that Alice sends Bob a URL to an article via an email message, and that Alice is a subscriber to identity server 230 but Bob is not. The email message received by Bob may include a customized version of the article URL (e.g., shortened via a link shortening service) that is appended with identifying information associated with Bob's user device 210. When Bob selects the article link, Bob's user device 210 may be directed to the article URL, but content server 220 may provide the identifying information appended to Bob's customized URL to identity server 230 so that Bob may view a conversation with Alice. In this example, the conversation may not be tied to a static URL, but may be displayed dynamically on the standard article page based on the identity of Bob's user device 210.

In another example, assume that Alice reads an article and sends it to Bob via an email message and to Carl via a SMS message. The email message that reaches Bob's user device 210 may include a carbon copy to Carl and/or may originate from a special email address that is not associated with Alice's email account. When Bob responds to the special email address, his response may be forwarded to Alice, added to a conversation thread on the article web page, and sent to Carl via a SMS message. In this example, all participants may remain tied to the conversation thread and may receive updates from others, no matter what method of communication the participants utilize.

Now assume that Alice sends the article to Bob via an email message and to Carl via an email message. Further, assume that Bob reads the article and responds and that Carl reads the article and responds. On the article page, Alice may view her conversation with Bob and her conversation with Carl. Bob may view his conversation with Alice, and Carl may view his conversation with Alice. However, Bob may not view Carl's conversation with Alice, and Carl may not view Bob's conversation with Alice.

As further shown in FIG. 6B, process 600 may include storing the message and the response (block 660). For example, content server 220 may store the message and the response in a data structure (e.g., memory 330, FIG. 3) associated with content server 220. In some implementations, content server 220 may store an entire conversation conducted between the user and the selected contact and privately displayed, in the content, to user devices 210 used by the user and the selected contact. In some implementations, content server 220 may utilize the stored information to determine whether the content is liked, disliked, preferred, not preferred, etc.

In some implementations, content server 220 may parse the text of the conversation to determine whether the content is liked, disliked, preferred, not preferred, etc. For example, if the parsed text includes negative words (e.g., bad, wrong, poor, etc.), content server 220 may determine that the user and/or the selected contact do not like the content. In some implementations, content server 220 may utilize the stored information to improve the content provided via content server 220.

Although FIGS. 6A and 6B show example blocks of process 600, in some implementations, process 600 may include additional blocks, fewer blocks, different blocks, or differently arranged blocks than those depicted in FIGS. 6A and 6B. Additionally, or alternatively, two or more of the blocks of process 600 may be performed in parallel.

Figure 7A:
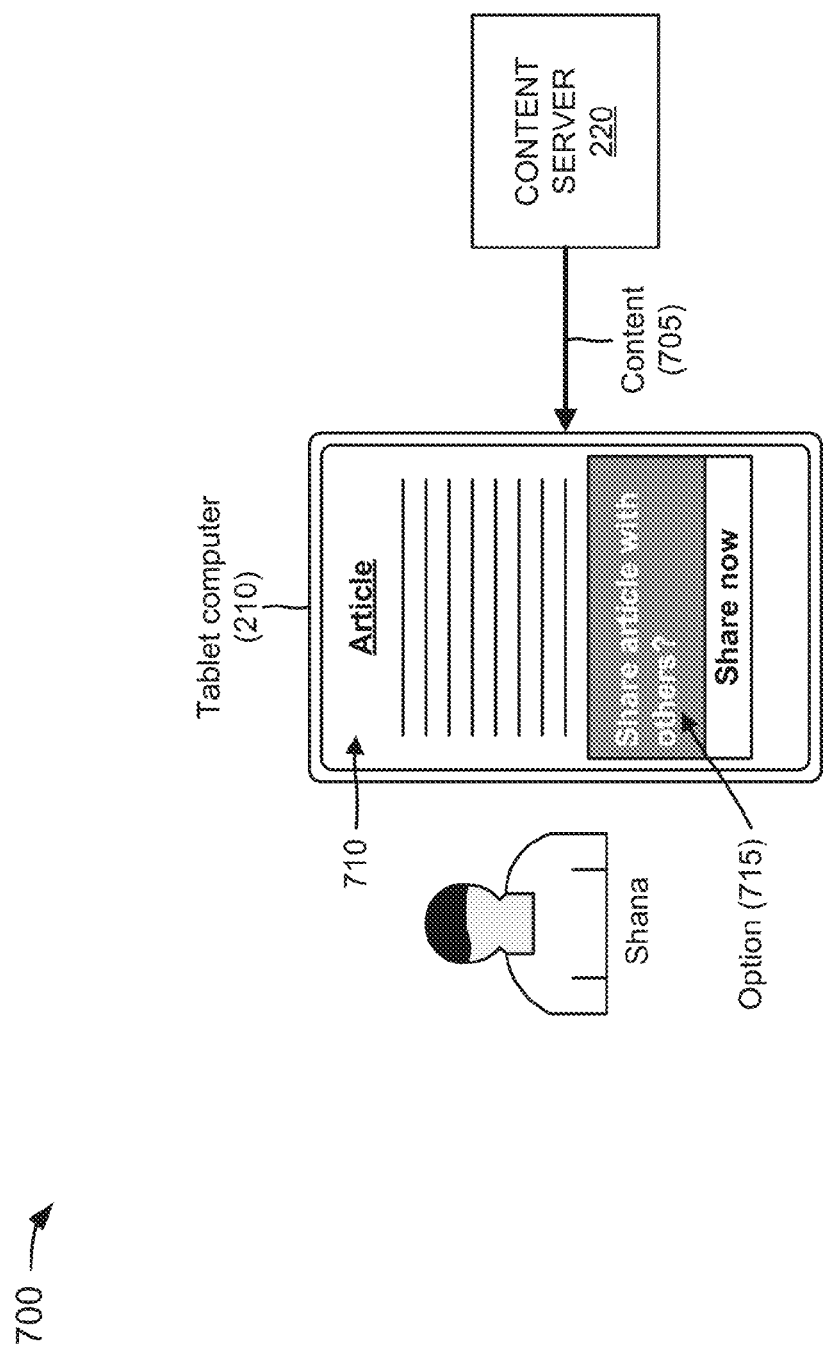

FIGS. 7A-7F are diagrams of an example 700 relating to example process 600 shown in FIGS. 6A and 6B. In example 700, assume that Shana is associated with a first user device 210 (e.g., a tablet computer 210), as shown in FIG. 7A. Further, assume that Shana utilizes tablet computer 210 to access content 705 provided by content server 220. For example, Shana may access an article 710 provided by a web site of content server 220, and tablet computer 210 may display article 710 to Shana. As further shown in FIG. 7A, messaging code 510 may cause content server 220 to provide, to tablet computer 210, an option 715 with article 710, and tablet computer 210 may display option 715 to Shana. In example 700, option 715 may ask whether Shana wants to share article 710 with others, such as contacts of Shana. Assume that Shana wants to share article 710 with her contacts, and utilizes tablet computer 210 to select option 715.

Figure 7B:
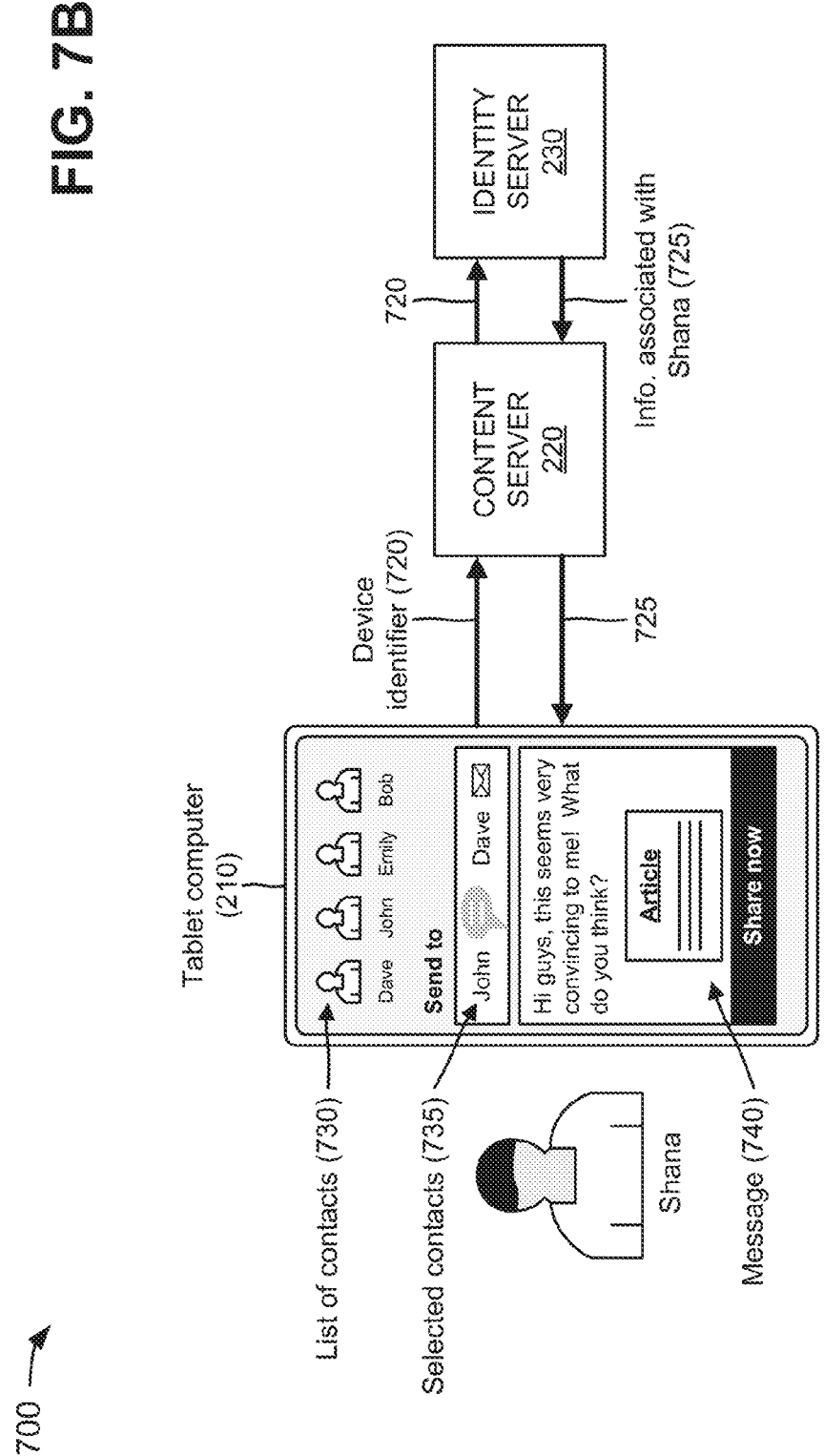

When Shana selects option 715, tablet computer 210 may provide a device identifier 720 (e.g., an IP address) of tablet computer 210 to content server 220, as shown in FIG. 7B. Content server 220 may provide device identifier 720 to identity server 230, and identity server 230 may identify Shana based on device identifier 720. Identity server 230 may obtain information 725 associated with Shana based on identifying Shana, and may provide information 725 (e.g., in an encrypted format) to content server 220. Information 725 associated with Shana may include, for example, Shana's name, an address book or a list of contacts associated with Shana, information associated with Shana's methods of sharing information with the contacts, etc. In some implementations, content server 220 may receive device identifier 720 when tablet computer 210 accesses article 710, and may obtain information 725 associated with Shana prior to Shana's selection of option 715.

As further shown in FIG. 7B, content server 220 may provide information 725 associated with Shana to tablet computer 210, and tablet computer 210 may decrypt information 725. In some implementations, content server 220 may provide, to tablet computer 210, a user interface that enables Shana to create a message for sending to one or more contacts. As shown in FIG. 7B, tablet computer 210 may display a list 730 of contacts (e.g., Dave, John, Emily, and Bob) associated with Shana and the user interface for creating the message.

Assume that Shana utilizes tablet computer 210 to select John and Dave from list 730 of contacts, and tablet computer 210 displays selected contacts 735 (e.g., John and Dave) in a "Send to" section of the message. Further, assume that information 725 associates Shana's methods of sharing information with selected contacts 735. For example, as shown in FIG. 7B, Shana may share information with John via text messaging, and may share information with Dave via email. After Shana selects John and Dave, assume that she creates a message 740 (e.g., "Hi guys, this seems very convincing to me! What do you think?"), and provides information identifying article 710 (e.g., an image of article 710 with an embedded link to article 710, a URL of article 710, etc.) in message 740. In some implementations, the information identifying article 710 may be automatically provided in message 740 without Shana's input. Further, assume that Shana utilizes tablet computer 210 to select a "Share Now" section of message 740.

When Shana selects the "Share Now" section of message 740, tablet computer 210 may provide message 740 to content server 220 and/or to message server 240, as shown in FIG. 7C. If tablet computer 210 provides message 740 to only content server 220, content server 220 may provide message 740 to message server 240. As further shown in FIG. 7C, message server 240 may provide message 740 to a second user device 210 (e.g., a smart phone 210) associated with John via Shana's method of sharing information with John. For example, since Shana specified that she shares information with John via text messaging, message server 240 may provide message 740 to smart phone 210 as a text message 745.

As further shown in FIG. 7C, after tablet computer 210 provides message 740 to content server 220 and/or message server 240, messaging code 510 may cause content server 220 to provide a conversation 750 for display, with article 710, to table computer 210. Tablet computer 210 may display conversation 750 and article 710 to Shana. As shown, conversation 750 may include the information provided in message 740 and information identifying Shana as the creator of message 740. In some implementations, content server 220 may privately provide conversation 750 for display, with article 710, to only Shana, John, and Dave.

Figure 7D:
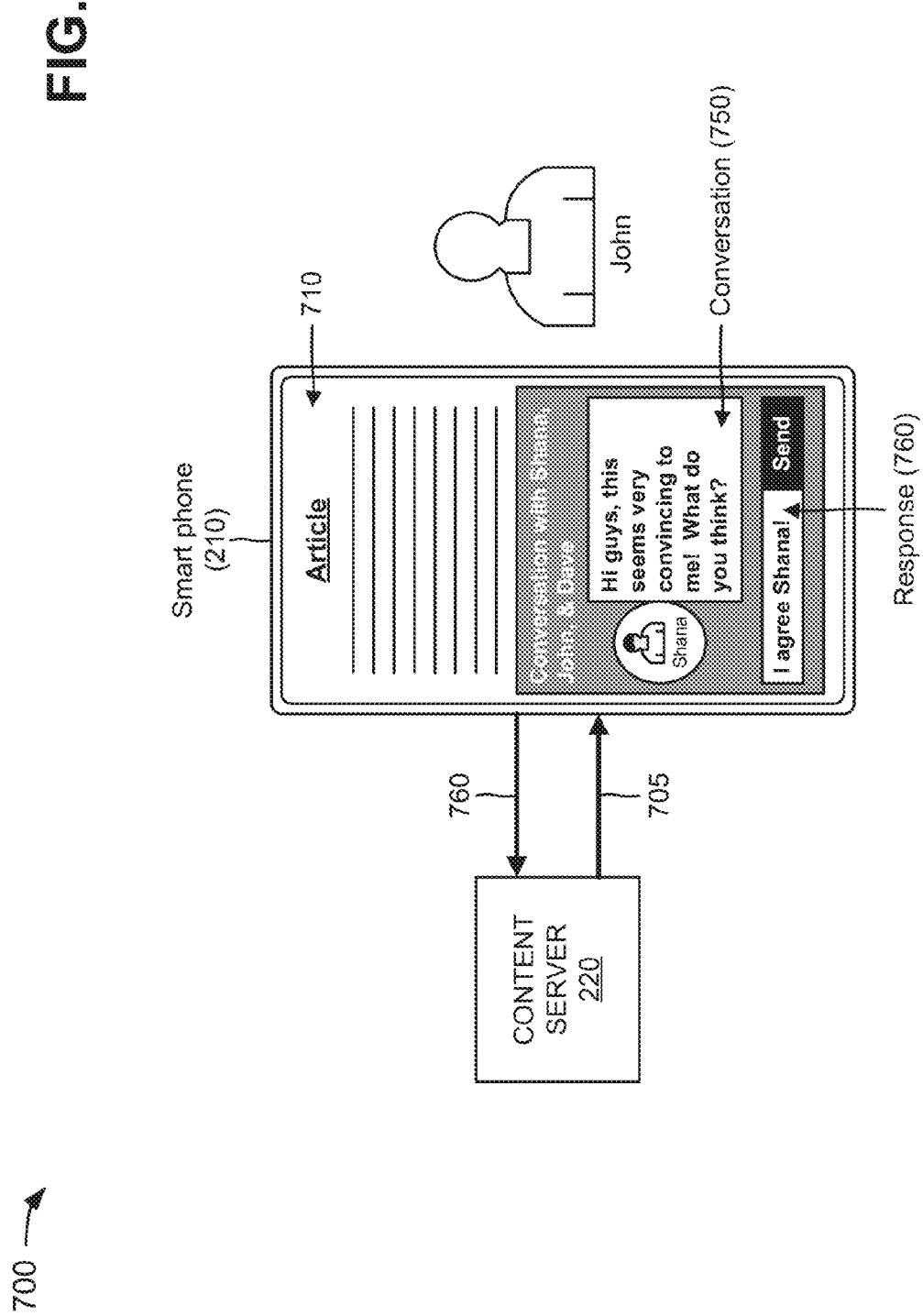

As shown in FIG. 7D, assume that John views text message 745 and utilizes smart phone 210 to select a link to article 710 provided in text message 745. When John selects the link to article 710, content server 220 may provide content 705 to smart phone 210, and smart phone 210 may display article 710 to John. As further shown in FIG. 7D, messaging code 510 may cause content server 220 to provide conversation 750 for display, with article 710, to smart phone 210, and smart phone 210 may display conversation 750 and article 710 to John. Conversation 750 may include a section for John to provide a response 760 to Shana's message 740. Assume that John utilizes smart phone 210 to input response 760 (e.g., "I agree Shana!"), and that smart phone 210 provides response 760 to content server 220.

Figure 7E:
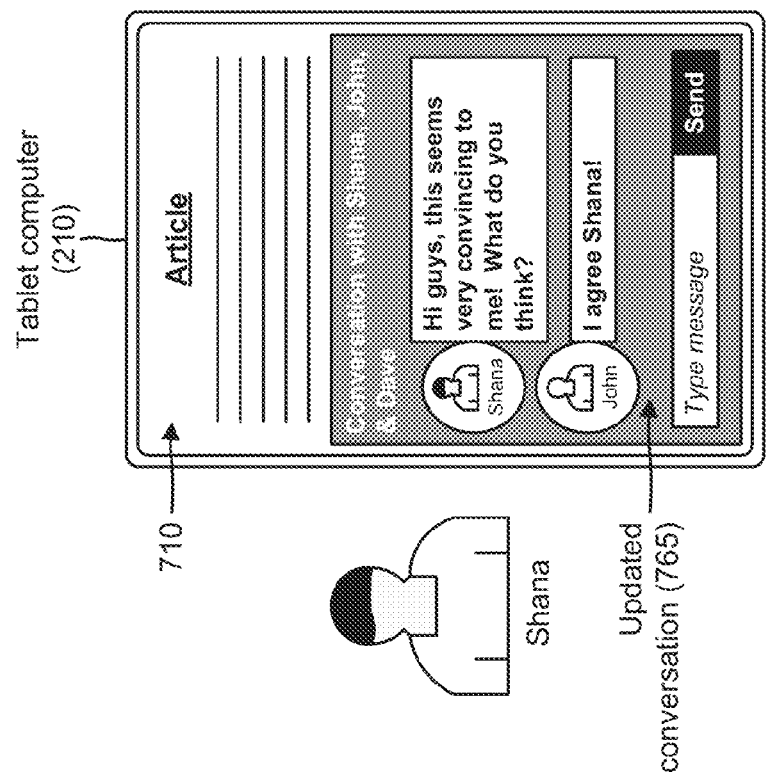

As shown in FIG. 7E, messaging code 510 may cause content server 220 to provide an updated conversation 765 for display, with article 710, to table computer 210. Tablet computer 210 may display updated conversation 765 and article 710 to Shana. As shown, updated conversation 765 may include the information provided in message 740, information identifying Shana as the creator of message 740, the information provided in response 760, and information identifying John as the creator of response 760. In some implementations, content server 220 may privately provide updated conversation 765 for display, with article 710, to only Shana, John, and Dave.

Figure 7F:
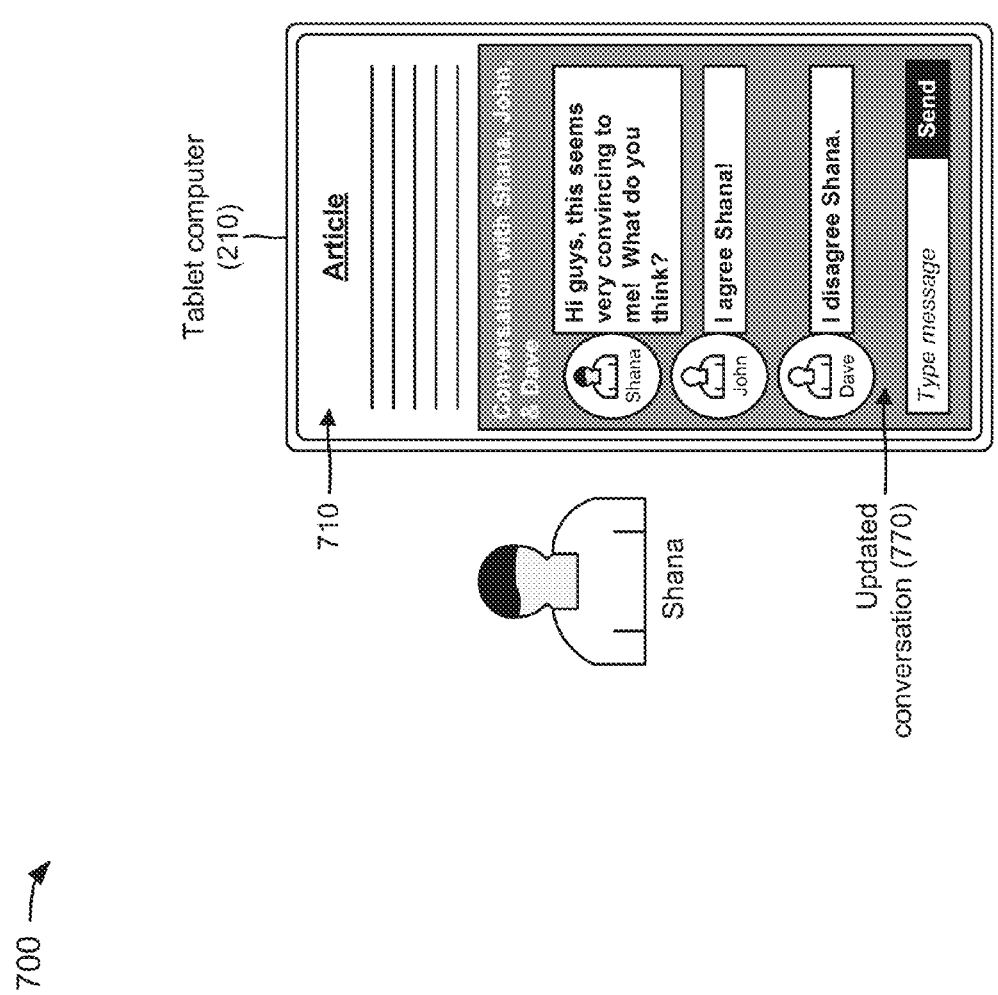

Now assume that Shana provided message 740 to a user device 210 associated with Dave, and that Dave utilizes user device 210 to create another response to Shana's message 740. Further, assume that Dave's user device 210 provides the other response to content server 220. As shown in FIG. 7F, messaging code 510 may cause content server 220 to provide an updated conversation 770 for display, with article 710, to table computer 210. Tablet computer 210 may display updated conversation 770 and article 710 to Shana. As shown, updated conversation 770 may include the information provided in message 740, information identifying Shana as the creator of message 740, the information provided in response 760, information identifying John as the creator of response 760, information provided in the other response (e.g., "I disagree Shana."), and information identifying Dave as the creator of the other response. In some implementations, content server 220 may privately provide updated conversation 770 for display, with article 710, to only Shana, John, and Dave.

As indicated above, FIGS. 7A-7F are provided merely as an example. Other examples are possible and may differ from what was described with regard to FIGS. 7A-7F. In some implementations, the various operations described in connection with FIGS. 7A-7F may be performed automatically or at the request of the user.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hard ware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
providing, by a device, content for display to a first user device associated with a user,
the user being a subscriber of the content;
providing for display, by the device and to the first user device, an option to share the content;
receiving, by the device, a selection of the option from the first user device;
causing, by the device and on the first user device, a list of contacts, associated with the user, to be presented for display based on the selection of the option;
receiving, by the device and from the first user device, a selection of a contact, as a selected contact, from the list of contacts;
receiving, by the device and from the first user device, a private message from the user for the selected contact;
providing, by the device and to a second user device, a version of an address of the content and information identifying the second user device,
the selected contact being associated with the second user device, and
the selected contact not being a subscriber of the content;
providing, for display, by the device and to the first user device and the second user device, a private version of the content,
the private version of the content including the private message,
the private version of the content being privately viewable only by the first user device and the second user device, and
the private version of the content expiring after a particular amount of time;
receiving, by the device and from the second user device, a response to the private message regarding the content, the response to the private message being for the user; and
providing for display, by the device and to the first user device and to the second user device, the response to the private message,
the response to the private message being included in the private version of the content.

2. The method of claim 1, further comprising:
receiving, from the first user device and the second user device, a conversation between the user and the selected contact; and
providing for display the conversation, with the content, to the first user device and the second user device,
the conversation being included in the private version of the content.

3. The method of claim 2, further comprising:
storing the conversation between the user and the selected contact.

4. The method of claim 1, where, prior to providing the content for display to the first user device, the method further comprises:
providing a request for a messaging code to a server device,
the messaging code enabling the device to provide, for display, a private conversation between the user and the selected contact, with the content;
receiving the messaging code from the server device based on the request;
providing, to the server device, information identifying preferences for the messaging code;
receiving, from the server device, configuration information for the messaging code based on the information identifying the preferences; and
configuring the messaging code based on the configuration information.

5. The method of claim 1, further comprising:
providing, to a server device, a device identifier associated with the first user device; and
receiving, from the server device and based on the device identifier, information identifying the user and the list of contacts of the user.

6. The method of claim 1, further comprising:
providing the private message and information identifying the content to a message server device,
the message server device providing the private message and the information identifying the content to the second user device in a particular format associated with the selected contact.

7. The method of claim 1, where providing for display, by the device and to the first user device and to the second user device, the private version of the content comprises:
at least one of:
providing for display, by the device and to the first user device and to the second user device, the private message at a beginning of the private version of the content,
providing for display, by the device and to the first user device and to the second user device, the private message at an end of the private version of the content, or
providing for display, by the device and to the first user device and to the second user device, the private message within a scrolled portion of the private version of the content.

8. A device, comprising:
one or more processors to:
provide content for display to a first user device associated with a user,
the user being a subscriber to the content,
provide for display, to the first user device, an option to share the content,
receive a selection of the option from the first user device,
cause a list of contacts, associated with the user, to be presented for display, on the first user device, based on the selection of the option,
receive, from the first user device, a selection of a contact, as a selected contact, from the list of contacts,
receive, from the first user device, a private message from the user for the selected contact,
provide, to a second user device, a version of an address of the content and information identifying the second user device,
the selected contact being associated with the second user device, and
the selected contact not being a subscriber to the content,
provide, for display, to the first user device and to the second user device, a private version of the content,
the private version of the content including the private message,
the private version of the content being privately viewable only by the first user device and the second user device, and
the private version of the content expiring after a particular amount of time;
receive, from the second user device, a response to the private message regarding the content,
the response to the private message being for the user; and
provide, for display to the first user device and to the second user device, the response to the private message,
the response to the private message being included in the private version of the content.

9. The device of claim 8, where the one or more processors are further to:
receive, from the first user device and the second user device, a conversation between the user and the selected contact, and
provide for display the conversation, with the content, to the first user device and the second user device,
the conversation being included in the private version of the content.

10. The device of claim 9, where the one or more processors are further to:
store the conversation between the user and the selected contact, and
utilize the stored conversation to modify the content provided by the device.

11. The device of claim 8, where, prior to providing the content for display to the first user device, the one or more processors are further to:
provide a request for a messaging code to a server device,
the messaging code enabling the device to provide, for display, a private
conversation between the user and the selected contact, with the content,
receive the messaging code from the server device based on the request,
provide, to the server device, information identifying preferences for the messaging code,
receive, from the server device, configuration information for the messaging code based on the information identifying the preferences, and
configure the messaging code based on the configuration information.

12. The device of claim 8, where the one or more processors are further to:

provide, to a server device, a device identifier associated with the first user device, and receive, from the server device and based on the device identifier, information identifying the user and the list of contacts of the user.

13. The device of claim 8, where the one or more processors are further to:

provide the private message and information identifying the content to a message server device, the message server device providing the private message and the information identifying the content to the second user device in a particular format associated with the selected contact, and the second user device accessing the content via the information identifying the content.

14. The device of claim 8, where the one or more processors, when providing, for display, the private version of the content to the first user device and to the second user device, are to:

provide, for display, the private message within a scrolled portion of the content.

15. A non-transitory computer-readable medium for storing instructions, the instructions comprising:

one or more instructions that, when executed by one or more processors of a device, cause the one or more processors to:

provide content for display to a first user device associated with a user, the user being a subscriber to the content, provide for display, to the first user device, an option to share the content, receive a selection of the option from the first user device, cause a list of contacts, associated with the user, to be presented for display, on the first user device, based on the selection of the option, receive, from the first user device, a selection of a contact, as a selected contact, from the list of contacts, receive, from the first user device, a private message from the user for the selected contact, provide, to a second user device, a version of an address of the content and information identifying the second user device, the selected contact being associated with the second user device, and the selected contact not being a subscriber to the content, provide, for display, to the first user device and to the second user device, a private version of the content, the private version of the content including the private message, the private version of the content being privately viewable only by the first user device and the second user device, and the private version of the content expiring after a particular amount of time;

receive, from the second user device, a response to the private message regarding the content, and the response to the private message being for the user; and provide, for display, to the first user device and to the second user device, the response to the private message, the response to the private message being included in the private version of the content.

16. The non-transitory computer-readable medium of claim 15, where the one or more instructions, when executed by the one or more processors, further cause the one or more processors to:

receive, from the first user device and the second user device, a conversation between the user and the selected contact, and provide for display the conversation, with the content, to the first user device and the second user device, the conversation being included in the private version of the content.

17. The non-transitory computer-readable medium of claim 16, where the one or more instructions, when executed by the one or more processors, further cause the one or more processors to:

store the conversation between the user and the selected contact.

18. The non-transitory computer-readable medium of claim 15, where the one or more instructions, when executed by the one or more processors, further cause the one or more processors to:

provide, to a server device, a device identifier associated with the first user device, and receive, from the server device and based on the device identifier, information identifying the user and the list of contacts of the user.

19. The non-transitory computer-readable medium of claim 15, where the one or more instructions, when executed by the one or more processors, further cause the one or more processors to:

provide the private message and information identifying the content to a message server device, the message server device providing the private message and the information identifying the content to the second user device in a particular format associated with the selected contact, and the second user device accessing the content via the information identifying the content.

20. The non-transitory computer-readable medium of claim 15, where the one or more instructions, when executed by the one or more processors, further cause the one or more processors to:

receive, from the first user device, a selection of a second contact, as a second selected contact, from the list of contacts, receive, from the first user device, a second message from the user for the second selected contact, provide, for display, the second message within the content, to the first user device and to a third user device, associated with the second selected contact, the second message being privately displayed to only the first user device and the third user device, receive, from the third user device, a response to the second message for the user, and provide, for display, the response to the second message within the content, to the first user device and to the third user device, associated with the second selected contact, the response to the second message being privately displayed to only the first user device and the third user device.

* * * * *